Dec. 3, 1957  C. H. STRIDH  2,814,826
CASING TREATING MACHINE PLANTS
Filed Jan. 25, 1954  3 Sheets-Sheet 1
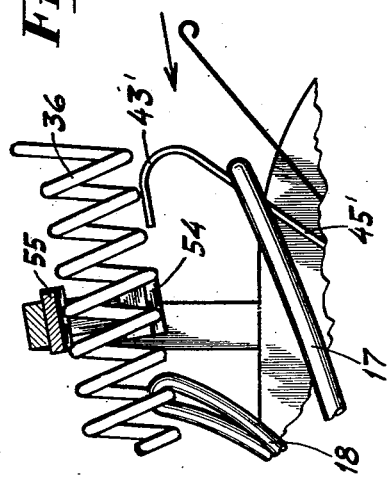
Inventor
C. H. Stridh
By
Wenderoths, Lind & Ponack
Attorneys

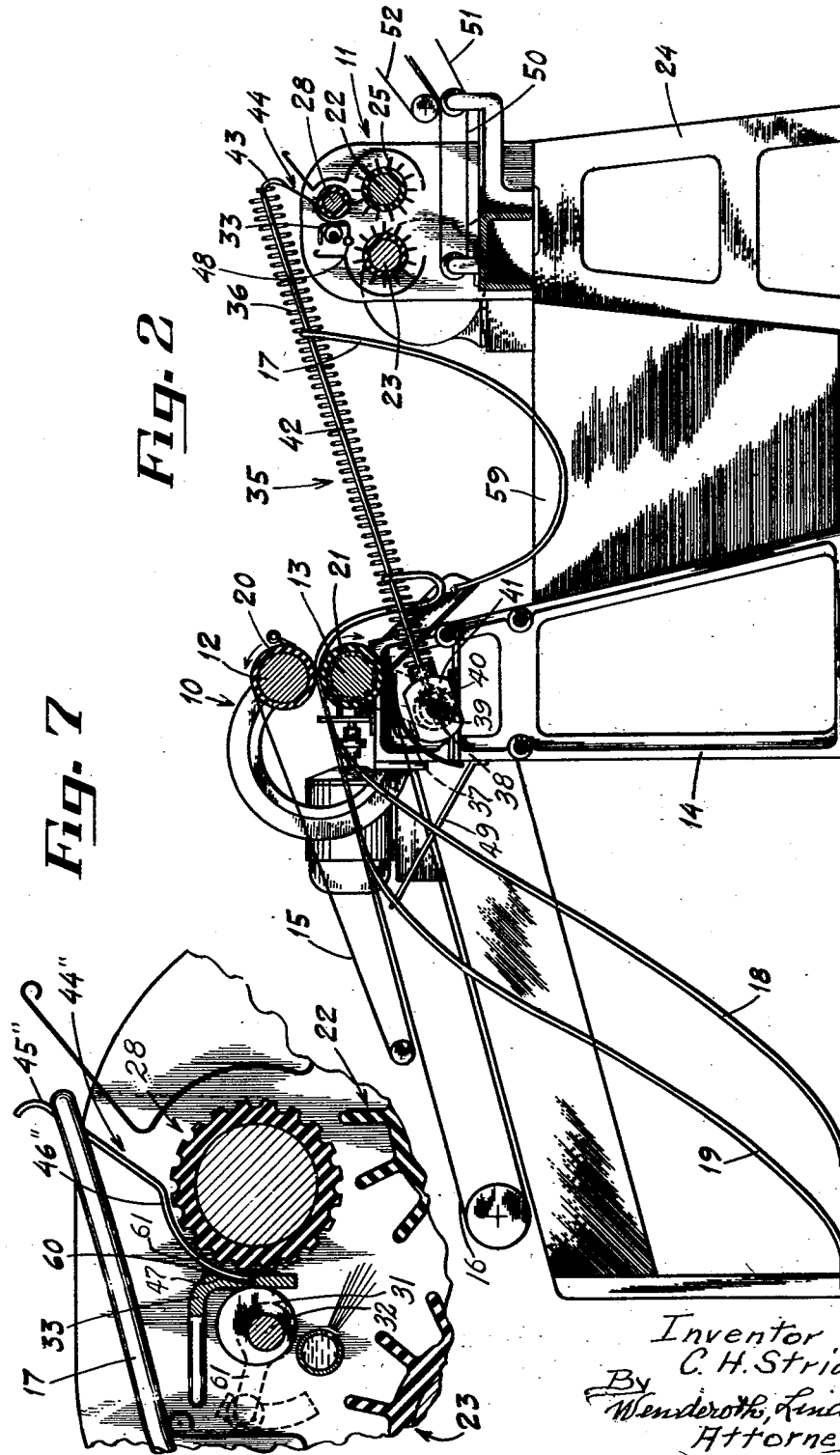

Dec. 3, 1957  C. H. STRIDH  2,814,826
CASING TREATING MACHINE PLANTS
Filed Jan. 25, 1954  3 Sheets-Sheet 3
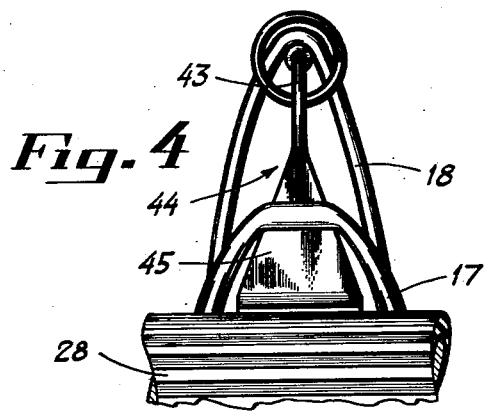
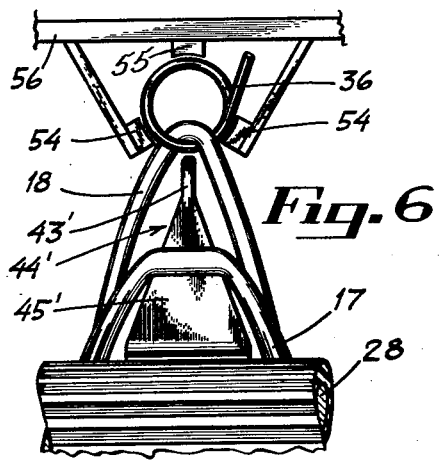
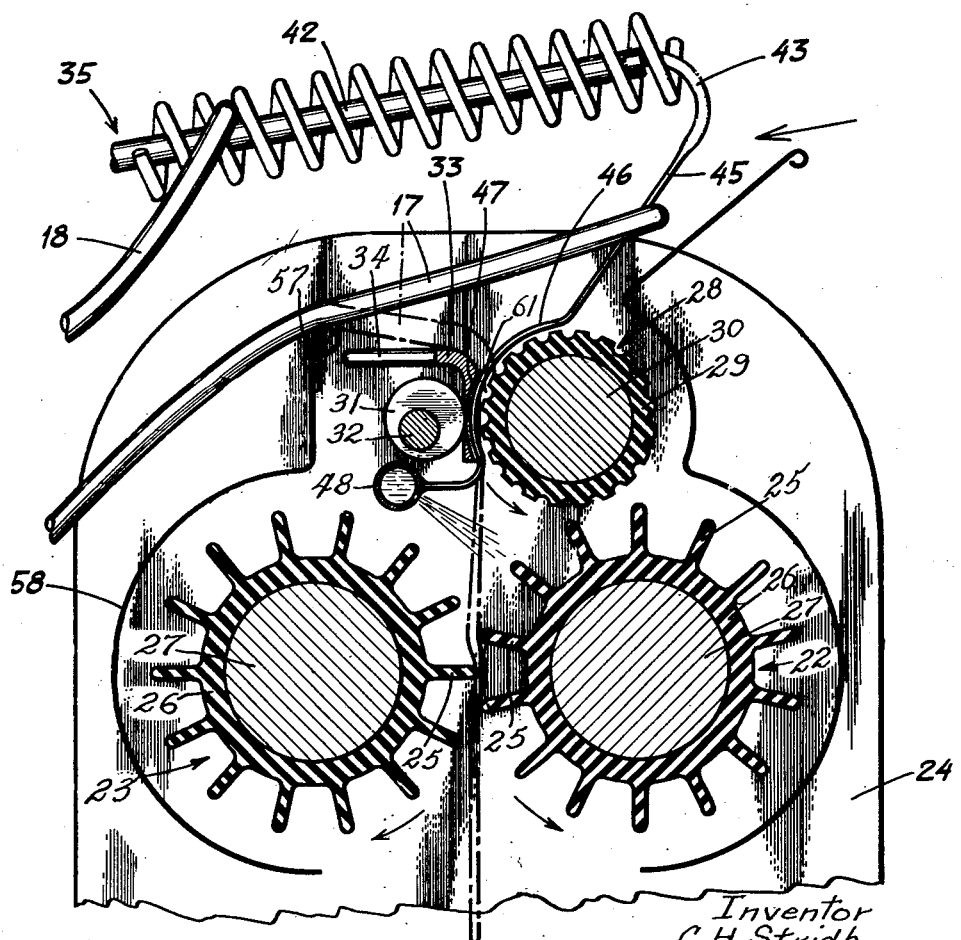
Inventor
C. H. Stridh
By Wenderoth, Lind & Ponack
Attorneys United States Patent Office 2,814,826
Patented Dec. 3, 1957

2,814,826

CASING TREATING MACHINE PLANTS

Carl Harry Stridh, Goteborg, Sweden

Application January 25, 1954, Serial No. 405,899

3 Claims. (Cl. 17—43)

In preparing sausage casings from animal intestines, the latter are first treated to remove the manure and food from the interior of the intestines and the untrimmed fat from the exterior of the intestines. Usually two machines are necessary for cleaning the intestines, but often a greater number of cleaning machines are used in a casing treating machine plant. Into the machine in the first station A where the manure is pressed out the intestines are fed in a looped position, i. e. the intestines are with their middle part first fed into the machine between two pressing rollers. From that machine the intestines are fed, still in looped position, to the cleaning machine in station B said latter machine being provided with a feeding roller for feeding the intestines into the machine. Between said two machines there is a conveyor means for conveying the intestines from the first machine to the next one.

The pressing rollers of the machine in station A must rotate with a relatively low velocity in order that the manure shall be pressed out through the ends of the intestines without bursting the wall of the intestine. In the second machine, however, the cleaning rollers must rotate with a relatively high velocity, because otherwise the cleaning effect aimed at will not be obtained. In order that the intestines shall not be torn up due to the higher speed of rotation of the rollers in the second machine, practically the whole of the intestines must have left the first machine before the intestine is fed into the second machine. Usually the intestines are conveyed from the first machine to the second machine by means of conveyor belts which run through trays about 50 feet long and containing water. Such trays require a considerable space and it is obvious that if the intestines are to pass through several cleaning machines of this type, very large floor space will be required. Such conveyor belts are subjected to great wear, and they must be adjusted and sometimes replaced.

It is an object of the invention to provide means for guiding the intestines from the conveyor means into the machine in question.

However, said guiding means may advantageously be used in casing treating machines of the above indicated structure without having a conveyor. The intestines may simply in a looped position be slid over said guiding means without any risk for the operator to get his fingers hurt.

In the accompanying drawings, similar reference characters are used to designate similar elements throughout the several figures.

Figure 1 is a plan view, illustrating a casing treating machine plant having a first and second casing treating machine constructed in accordance with the present invention.

Figure 2 is a side view, partly in section, of the treatment stations A and B according to Fig. 1.

Figure 3 is on a greater scale a vertical section along line III—III in Fig. 1 of the upper part of the machine of station B.

Figure 4 is an enlarged fragmentary end view, of the conveyor and guiding means, seen in the direction of the upper arrow in Fig. 3.

Figure 5 is an enlarged side view, partly in section, of the feeding-out end of the conveyor according to another embodiment of the invention.

Figure 6 is an enlarged fragmentary end view of the conveyor and guiding means, seen in the direction of the arrow in Fig. 5.

Figure 7 is an enlarged partial vertical section similar to Figure 3 of the upper part of a casing treating machine without a conveyor but with a guiding member according to a modified embodiment of the invention.

The cleaning machines, illustrated in the drawings, are numbered 10 and 11. The machine 10 is provided with two rotatably driven rollers 12 and 13, journalled on two uprights 14. Further, the machine 10 is provided with two conveyor belts 15 and 16 between which the intestines 17, 18, 19 are in a looped position fed up to the rollers 12, 13 which have a mantel 20, 21 of rubber or other suitable elastic material. The pressure between the rollers 12 and 13 should be sufficient to press the bulk of the food and manure from the interior of the casings and to simultaneously strip the remnants of untrimmed fat from the exterior of the casings.

The second machine 11 has two cleaning rollers 22 and 23 journalled on two uprights 24, said rollers being provided with scraping blades 25 at their periphery. The rollers 22, 23 are driven in such a way that one blade 25 of the one roller 23 will always project into the space between two adjacent blades of the other roller 22. According to the embodiment illustrated on the drawings the blades 25 comprise longitudinal ribs of a mantel 26 of rubber enclosing the roller bodies 27. Above the roller 22 is journalled a feeding roller 28 with a corrugated mantel 29 of rubber or other suitable elastic material around the roller body 30. By means of a number of eccentric sheaves 31 fixed to a shaft 32 a feeding plate 33 with a pair of handles 34 can be adjusted to and from the feeding roller 28 in order to get the proper width of the space 35 through which the intestines 17, 18, 19 are to be fed. The periphery velocity of the cleaning rollers 22 and 23 is greater than that of the feeding roller 28 which results in a scraping action of the blades 25 on the outer side of the intestines 17 (disclosed with dot and dash lines in Fig. 3) when passing between the cleaning rollers 22, 23.

A conveyor 35 extends from a point below the roller 13 of machine 10 to the top of machine 11. According to the embodiment disclosed in the drawings this conveyor comprises a spirally wound metal rod 36 which is arranged in the longitudinal middle plane through the two machines (see Fig. 1). The conveyor 35 is rotatably driven from the lower roller 13 of machine 10 by means of a driving chain 37, a belt or the like via a shaft 38 parallel with the roller 13 and two conical gears 39, 40 within a cover 41 carried by the uprights 14 (see Fig. 2).

According to the embodiment disclosed in Figs. 1–4 the spirally wound rod 36 encloses a longitudinal bar 42 which serves as a carrier for the loop of the intestines 17, 18, 19 when forced upwards by the rotating spiral. At the upper end the bar 42 which preferably comprises a tube is journalled on the stave-formed top 43 of a guide member 44 in the form of a substantially triangular plate 45 which with a curved portion 46 extends partly around the feeding roller 28. Said curved portion 46 projects into a groove 47 in the middle of the feeding plate 33. At the bottom the triangular plate 45 is fixed to a transverse bar 48 of the machine 11. According to Figure 3 said bar 48 consists of a water tube with holes for spraying water onto the intestines to be cleaned in machine 11. The width of the space between the curved portion 46 of the plate 45 and the feeding roller 28 is such that the latter will be able to cause the necessary friction effect on the intestines to be fed down to the scraping rollers 22, 23.

The rollers 12, 13 and 22, 23 rotate in the direction of the arrows on the drawings. As soon as one intestine 18 has been fed far enough out of the machine 10 the loop of said intestine will hang down on the bar 42 between two adjacent windings of the spiral 36 and, due to rotation of the latter, be forced slowly upwards on said bar. The speed of rotation of the spiral 36 is such that the travel of the loop of said intestine has not come to an end until the ends of the intestine have passed through the machine 10, or almost so. At the upper end of the conveyor 35 the last winding of the spiral 36 puts the loop of the intestine over the bend of the top part 43 of the guide member 44, and then the loop slides down the triangular plate 45 to the space between the curved part 46 of said plate and the feeding roller 28 which forces said loop further to contact the feeding plate 33 at both sides of the guide member 44. By means of a bow-like guiding member 49 (only disclosed in Figures 1 and 2 in connection with machine 10 but not in connection with machine 11) the two parts of the intestines which extend backwards from the loop are forced apart and travel during the downward feeding movement towards the ends of the feeding roller 28. Due to the action of said guiding members 49 several intestines at the same time can be treated in the machine 10 and 11. From machine 11 the cleaned intestines can travel to one or more cleaning machines, e. g. by means of conveyor belts 50, 51 and 52 (or a conveyor 35).

About the same effect may be obtained, if the conveyor has a structure according to Figures 5 and 6. In this embodiment the spiral does not surround any bar for carrying the intestines. Instead, the intestines hang down from the windings of the spiral 36. In order not to bend down at the free end of the conveyor due to the weight of the same and of the intestines conveyed to the machine 11, the spiral 36 is journalled at its free end in three stationary slide blocks 54, 54 and 55 on a beam 56 fixed to the machine 11 in any suitable manner. The two lower blocks 54 are spaced apart to allow the intestines to travel between them (see Fig. 6). The top part 43' of the guide member 45' is disposed below the free end of the conveyor spiral (see especially Fig. 5).

As obvious from Figures 5 and 6, the intestines by the end winding of the spiral 36 at its upper end during rotation will be forced over to the guiding member 44' and from the latter to the feeding means 28, 33.

When forced between the scraping roller 22, 23 the intestines 17 slide over the upper edge 57 (Fig. 3) of a cover 58 around the rotating details of machine 11.

The tray 59 between the machines 10 and 11 need not have a length beyond about three feet, which means a considerable save in floor space.

As obvious from Fig. 7 the guiding member 44 may be used in connection with casing treating machines not provided with a conveyor. According to this embodiment the curved 46" end of guiding plate 44" is inserted into a groove 47 in the upper part of the feeding plate 33 and is attached to plate 33 by a weld 60 between guiding member 44" and feeding plate 33. At one of its ends the shaft 32 is provided with a hand lever 61 by means of which the shaft 32 and thus also the eccentric sheaves 31 can be turned thereby increasing or decreasing the space between feeding roller 28 and the feeding plate 33 with the curved portion 46" of the guiding plate 44", at will.

In operation of the machine the intestines 17 are hung with their loop over the upper part of the guide member 44", and thereafter the intestines will slide downwards to the feeding roller 28 which forces them into the space 61 between the roller and the curved portion 46" of the guiding plate 44" and further to the space between the roller and the feeding plate 33. The loop then enters into the space between the scraping rollers 22, 23 where the intestines are cleaned. There is no risk for the operator to get his fingers into the space between the feeding roller 28 and the feeding plate 33.

Various changes in details of construction may obviously be resorted to without departing from the spirit of the invention. Other conveyor means than spirals may be used for conveying the intestines from one machine to the next one.

What I claim is:

1. In a casing treating machine having a feeding roller thereon for feeding animal intestines to be cleaned in a looped position into the machine, and having opposite the feeding roller a feeding plate on the machine for obtaining the necessary friction and guiding effect between the feeding roller and the intestines to feed the intestines into the machine, that improvement comprising a rigid guiding member attached to said machine immediately below the feeding plate, said guiding member having a base curved along the outer periphery of the feeding roller with a curvature substantially parallel to the outer periphery of the feeding roller, said base being spaced from the outer periphery of the feeding roller, said member extending upwardly from the feeding roller and adapted to guide the loop of the intestines from above the roller and feeding plate into the space between the feeding plate and the feeding roller.

2. The improvement as claimed in claim 1 in which said guiding member is a substantially triangular plate with a base forming said base of said guiding member, and the feeding plate has a groove therein in which said base of said triangular plate is inserted for holding it spaced from said feeding roller.

3. In a casing treating machine plant having a first and a second casing treating machine spaced from each other and each having a feeding roller thereon for feeding animal intestines to be cleaned into the machines and having a rotatably driven spiral mounted between the treating machines with an end thereof at the second casing treating machine for conveying the intestines in a looped position from the first machine to the second machine, that improvement comprising a guiding member on the second machine for guiding the loop of the intestines into engagement with the feeding roller thereon, said guiding member comprising a rigid metal plate attached to said machine immediately below the feeding plate, said metal plate having a lower end curved along a part of the outer periphery of the feeding roller on the second machine with a curvature substantially parallel to the outer periphery of the feeding roller, said lower end being spaced from the outer periphery of the feeding roller, said plate having an upper end positioned immediately adjacent the end of the rotatably driven spiral to receive the loops of the intestines.

References Cited in the file of this patent

UNITED STATES PATENTS

| | | |
|---|---|---|
| 214,929 | Locke et al. | Apr. 29, 1879 |
| 1,702,554 | Walker | Feb. 19, 1929 |
| 2,048,870 | Kannee | July 28, 1936 |
| 2,125,950 | Pardekooper | Aug. 9, 1938 |
| 2,239,199 | Pulley | Apr. 22, 1941 |
| 2,244,179 | Stridh | June 3, 1941 |
| 2,563,465 | Hager | Aug. 7, 1951 |

FOREIGN PATENTS

| | | |
|---|---|---|
| 668,534 | Great Britain | Mar. 19, 1952 |